Patented Sept. 11, 1934

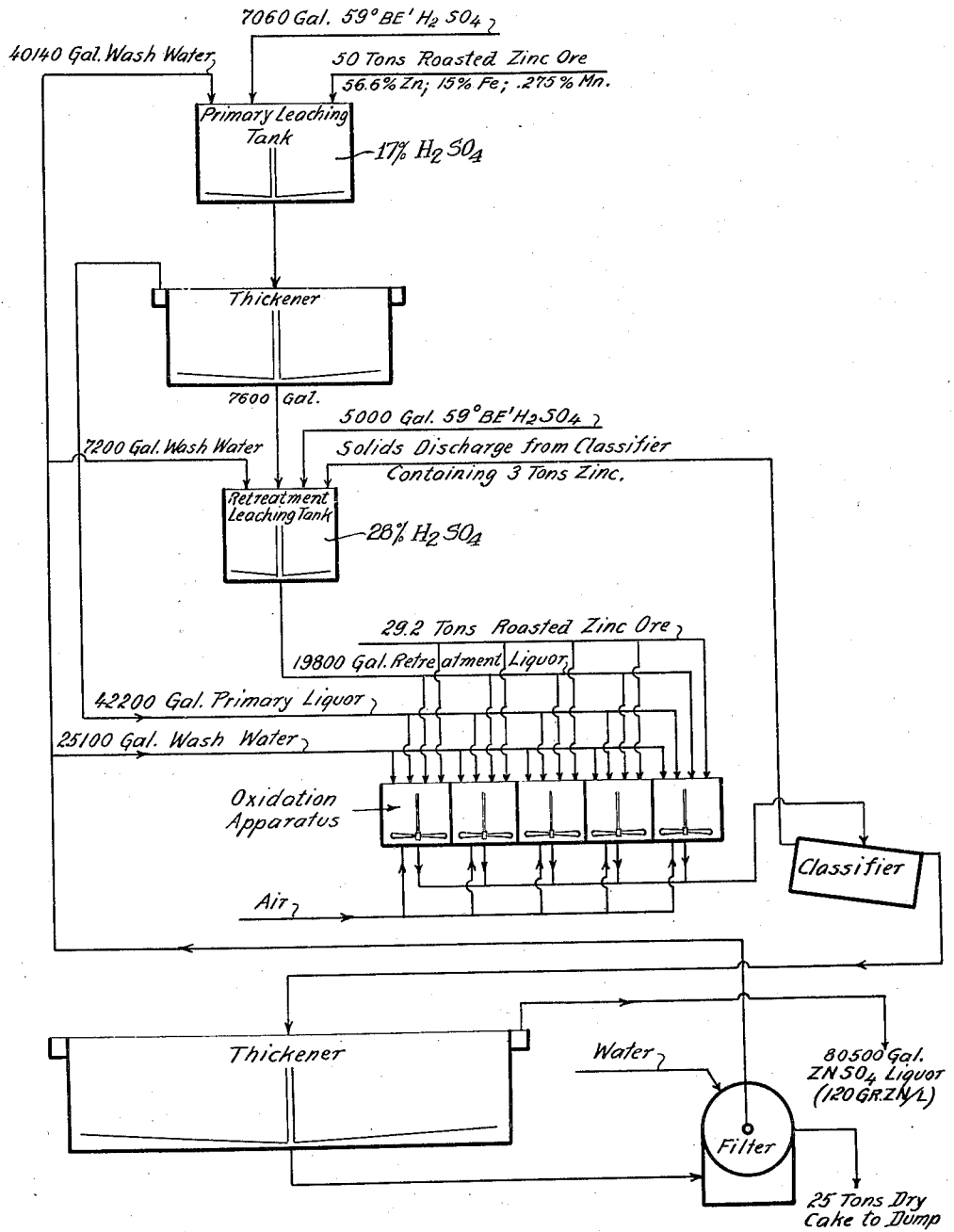

1,973,295

UNITED STATES PATENT OFFICE 1,973,295

TREATMENT OF ZINCIFEROUS MATERIAL

Arne J. Myhren, Palmerton, Pa., assignor to The New Jersey Zinc Company, New York, N. Y., a corporation of New Jersey Application July 26, 1932, Serial No. 624,704

6 Claims. (Cl. 23—125)

This invention relates to the treatment of zinciferous material with sulphuric acid to produce zinc sulphate, and has for its object the provision of certain improvements therein relating to the purification of the resulting zinc sulfate from iron where the zinciferous material is of relatively high iron content. The invention is particularly applicable to the treatment with sulphuric acid of roasted zinc sulphide ores, concentrates and other oxidic zinciferous material with a relatively high iron content, but may be applied to the treatment of any form of zinciferous material containing iron susceptible of conversion to zinc sulphate by appropriate treatment with sulphuric acid.

When zinc ores containing iron are roasted, part of the zinc oxide formed by the roasting of the zinc sulphide combines with the ferric oxide concurrently formed during the roasting to form zinc ferrite ($ZnO \cdot Fe_2O_3$). Zinc ferrite is not appreciably attacked by the dilute sulphuric acid (e. g. 17% $H_2SO_4$) that can be efficiently used for leaching roasted zinc ores with low iron content. In consequence, most of the zinc ferrite present tends to remain with the residue when dilute sulphuric acid is used in the leaching. Sulphuric acid of relatively high strength (e. g. 28% $H_2SO_4$) is requisite to bring zinc combined as zinc ferrite into solution as zinc sulphate. However, sulphuric acid of adequate strength to extract zinc from zinc ferrite will likewise dissolve part of the iron as ferric sulphate, thus forming a solution containing a relatively high concentration of ferric iron. In the leaching of such ores it is necessary to add sulphuric acid in excess to secure satisfactory recoveries of zinc. The excess sulphuric acid is neutralized after the leaching, preferably with zinc oxide in the form of roasted ore or refuse zinc oxide. When a zinc sulphate liquor containing a relatively high concentration of ferric iron is thus neutralized, the iron is precipitated as hydroxide. This precipitate of iron hydroxide is very bulky and slimy and gelatinous in nature. It does not settle well and is difficult to filter and wash, so that zinc sulphate solution is lost with it. This slimy precipitate likewise interferes with the neutralization of the zinc sulphate liquor with roasted ore, by coating the ore particles and shielding them from reaction with the excess acid. This results in an excessive consumption of roasted zinc ore or other form of zinc oxide for neutralization. The losses of zinc thus incurred substantially offset the increased recovery of zinc from zinc ferrite secured by the use of strong sulphuric acid.

The present invention contemplates a method of leaching zinc ores and other zinciferous material containing zinc ferrite (or a similar difficultly soluble combination of zinc and iron) in substantial amount which obviates the aforementioned difficulties. In its broad aspect, the invention involves a two-stage leaching treatment of the zinciferous material, in the first stage of which the material is subjected to the action of relatively dilute sulphuric acid until a large proportion of the zinc content of the material has been converted to zinc sulphate, and in the second stage of which the residual material from the first stage is subjected to the action of relatively strong sulphuric acid until large proportions of the zinc and iron contents thereof have been converted to sulphates. The zinc and iron sulphate liquor resulting from the second stage treatment is subjected to an oxidizing treatment in the course of which substantially all of the iron is precipitated, whereupon the iron precipitate is appropriately removed from the liquor associated therewith. It is now my preferred practice to carry out the invention, in its complete aspect, by the combination of the following coordinated steps:

(1) Leaching the roasted zinc ferrite-bearing ore with relatively dilute sulphuric acid (e. g. 17% $H_2SO_4$) to obtain a primary zinc sulphate solution with a relatively low content of iron, in particular a low content of ferric iron, by extracting from the ore a large part of that portion of the zinc oxide not combined as zinc ferrite.

(2) Leaching the residual material resulting from the preceding operation with a relatively concentrated sulphuric acid (e. g. 28% $H_2SO_4$) in order to dissolve as zinc sulphate the zinc oxide combined with ferric oxide as zinc ferrite. The secondary zinc sulphate liquor thus obtained has a relatively high iron content, but the total amount of iron dissolved during steps (1) and (2) is less than would be dissolved if the zinc ore were in contact with concentrated sulfuric acid during the entire leaching operation.

(3) Slowly and gradually adding (with appropriate stirring) the secondary zinc sulphate liquor with high iron content obtained in the preceding operation (2) into the primary zinc sulphate solution during the step of precipitating iron by oxidation. The precipitation is preferably accomplished by the oxidizing action of air in a finely disseminated state in the presence of a base (such as zinc oxide) and a compound of copper (such as cupric sulphate). The zinc oxide or other base serves to neutralize the excess sulphuric acid employed in the leaching operations as well as the sulphuric acid liberated in the oxidation and hydrolysis of the iron compounds, while the copper compound serves as a catalyst and accelerates oxidation.

When the secondary zinc sulphate solution high in ferric iron resulting from the second leaching step with relatively concentrated sulphuric acid is added slowly in this manner to the primary zinc sulphate solution with relatively low ferric iron concentration (obtained in the first leaching step with relatively dilute sulphuric acid) during the iron precipitation by neutralization and oxidation, the high ferric iron content of the secondary zinc sulphate solution is progressively diluted, so that the precipitate of ferric hydroxide and/or basic ferric sulphate thereby obtained is easy to settle and filter since it is neither bulky nor slimy. Thus, in accordance with the present invention, the purification of the zinc sulphate solutions with high ferric iron content is facilitated by mixing them progressively with zinc sulphate solutions with low ferric iron content during the step of precipitating iron from the solutions.

The iron precipitate obtained in the step of purifying the zinc sulphate solutions from iron may be utilized to produce a red iron pigment by washing, drying and subsequent calcination, if necessary.

It is now my preferred procedure, in practicing the invention, to convey the entire reaction product of the neutralizing and oxidizing operation to an appropriate classifier in which relatively coarse and heavy solids consisting of undisintegrated zinc ore or other zinciferous material treated are separated from the relatively fine iron precipitate and may advantageously be returned for retreatment with concentrated sulphuric acid along with the aforementioned residual material. The overflow from the classifier is conveyed to a thickener, or other suitable settling apparatus, from which the final zinc sulphate liquor is withdrawn (by overflow, decantation or the like) and subjected to further purification. The slurry or sludge from the thickener is appropriately filtered, and the resulting filter-cake washed with water. The wash water may advantageously be utilized to produce with highly concentrated sulphuric acid leaching liquor of the sulphuric acid strengths contemplated by the invention.

The diagrammatic flow sheet of the accompanying drawing illustrates a practical example of the application of the invention in its complete aspect and in its now preferred form. It is to be understood that this example is merely explanatory and illustrative of the practice of the invention with a particular zinciferous material, and is in no sense to be considered as limiting or restricting the applicability or scope of the invention.

The zinciferous material treated in this example is a roasted blende of relatively high iron content containing 56.6% total zinc, of which 46.1% is zinc combined as free zinc oxide and 10.5% is zinc combined as zinc ferrite. In addition, this roasted zinc ore contains 15% total iron and 0.275% manganese. In each cycle of the process (lasting about 3 hours) 50 net tons of this zinciferous material is charged dry into the primary leaching tank (about 14 feet in diameter and 8 feet high). There is added thereto 40,140 gallons of wash water (originating from the step of washing the filter-cake ultimately produced in the last stage of the process) and a concentration of about 17% $H_2SO_4$ is established by adding 7,060 gallons of 59° Bé. sulphuric acid. The mixture of this wash water and the acid yields 47,200 gallons of 17% sulphuric acid, an amount equal to 105% of the theoretical equivalent of the zinc present. After appropriate stirring and mixing in the primary leaching tank, the resulting slurry is passed in toto to a thickener (about 20 feet in diameter and 8 feet high). The inflow into this thickener is 49,800 gallons of slurry with a specific gravity of 1.31. The overflow from the thickener consists of 42,200 gallons of primary liquor containing as zinc sulphate the greater part of the zinc present as uncombined zinc oxide in the original roasted ore. The zinc content of the primary liquor is 130 grams per liter. The sludge underflow from the thickener constitutes the residual material to be retreated and consists of 7,600 gallons with a specific gravity of 1.85. This residual material contains a total zinc content of 14.7% (of which 7.7% is in a form insoluble in the concentration of sulphuric acid present), 12.8% iron and 52.7% water; the total solids present being 30%.

The residual material from the thickener passes to the retreatment leaching tank (about 12 feet in diameter and 8 feet high). There is added to this tank (along with the residual material) 7,200 gallons of wash water (from the same source as the wash water added to the primary leaching tank), and a concentration of about 28% $H_2SO_4$ is established by adding 5,000 gallons of 59° Bé. sulphuric acid. About 3 tons of zinc contained in the relatively coarse and heavy solids (sands discharge) from a classification treatment at a subsequent stage in the process are likewise added to this tank. The initial acid strength in the retreatment leaching tank is 28% $H_2SO_4$. The output or product of the retreatment operation consists of 19,800 gallons of slurry with a specific gravity of 1.47. The retreatment is preferably conducted at a temperature of about 75-85° C., with appropriate stirring of the material undergoing treatment. About 85% of the zinc present as ferrite and 85% of the iron are extracted. The resulting slurry analyzes about 96 grams of zinc per liter, 78 grams of ferrous iron per liter, 67 grams of ferric iron per liter and 53 grams of sulphuric acid per liter.

The overflow from the thickener (intermediate the two leaching tanks) has in the meantime passed to the oxidation apparatus. This apparatus consists of 10 cells, each measuring 6 feet by 6 feet by 5 feet and each equipped with a rotary stirrer capable of a peripheral speed of 720 feet per minute. Air is blown in underneath the stirrers and is finely disseminated thereby. 42,200 gallons of primary zinc sulphate liquor from the thickener enter the oxidation cells together with 25,100 gallons of wash water from the filter where the ultimate filter-cake is washed. To this primary liquor there is added 29.2 tons of roasted zinc ore (flotation concentrates). The 19,800 gallons of the slurry from the retreatment leaching tank is added slowly and uniformly to the mixture of primary zinc sulphate liquor, wash water and roasted ore. A small amount of a copper compound (e. g. cupric sulphate) is added to serve as a catalyst for the oxidation of the small amount of ferrous iron. The cycle for filling and discharging the oxidation cells is three hours.

The amount of wash water added to the oxidation cells is such as to form with the zinc ore added thereto a slurry of approximately the same consistency as that of the combined primary zinc sulphate liquor and retreatment slurry. The 29.2 tons of roasted zinc ore added is calculated (through its zinc oxide content) to neutralize both the free sulphuric acid in the liquors and sulphuric acid liberated by the hydrolysis occurring during the oxidation and the precipitation of the iron compounds. On the basis of the zinc oxide content of this roasted ore, 6.4 tons are required to neutralize the free sulphuric acid and 22.8 tons to neutralize the sulphuric acid liberated during hydrolysis, assuming complete hydrolysis to Fe(OH)₃. The amount used is thus equal to that theoretically required. The reactions involved are as follows:

(a) Hydrolysis of ferric sulphate

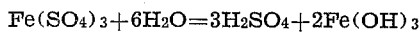
$$Fe(SO_4)_3 + 6H_2O = 3H_2SO_4 + 2Fe(OH)_3$$

(b) Oxidation and hydrolysis of ferrous sulphate

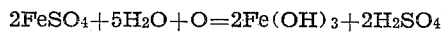
$$2FeSO_4 + 5H_2O + O = 2Fe(OH)_3 + 2H_2SO_4$$

(in the presence of copper compounds acting as catalyst)

(c) Neutralization of the sulphuric acid

$$H_2SO_4 + ZnO = ZnSO_4 + H_2O$$

The slurry from the cells where the oxidation and precipitation of iron is carried out is conveyed to a classifier, measuring about 12 feet by 5 feet by 2 feet. The slimes overflow from this classifier is 85,700 gallons with a specific gravity of 1.28. The sands or solids discharge of the classifier (consisting of relatively coarse and heavy solids in the slurry from the oxidation cells) contains aproximately 3 net tons of zinc substantially as zinc ferrite which has remained undecomposed by the sulphuric acid treatment. This solid material is returned to the retreatment leaching tank for retreatment along with the residual material, as hereinbefore described.

The overflow (slimes discharge) from the classifier passes to a thickener (about 40 feet in diameter). The overflow from the thickener consists of 80,500 gallons of zinc sulphate liquor containing about 120 grams of zinc per liter. The sludge underflow of the thickener is conveyed to a filter where the iron precipitate is filtered and washed with 72,440 gallons of washing water, 40,140 gallons of which is returned to the primary leaching tank, 7,200 gallons is returned to the retreatment leaching tank, 25,100 gallons is returned to the oxidation cells. The filter cake from the filter consists when dry of 25 net tons iron precipitate containing some gangue from the ore. This iron precipitate contains a certain amount of ferric sulphate and ordinarily has the empirical formula

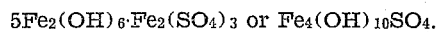
$$5Fe_2(OH)_6 \cdot Fe_2(SO_4)_3 \text{ or } Fe_4(OH)_{10}SO_4.$$

The zinc sulphate liquor in the overflow from the thickener is subjected to any contemplated subsequent treatment. Ordinarily, the liquor is subjected to further purification, for example, for the removal of manganese, cadmium and lead. Following such purification, the zinc sulphate liquor may be utilized as desired, as, for example, in the manufacture of lithopone.

I claim:

1. The improvement in the treatment of zinciferous material of relatively high iron content with sulphuric acid to produce zinc sulphate substantially free from iron, which comprises subjecting the zinciferous material to the action of relatively dilute sulphuric acid until a large proportion of the zinc content of the material has been converted to primary zinc sulphate solution, separating the resulting primary zinc sulphate liquor from the residual material, subjecting said residual material to the action of relatively strong concentrated sulphuric acid until a large proportion of the zinc content thereof has been converted to secondary zinc sulphate solution, subjecting said primary zinc sulphate liquor to a rapid oxidizing treatment while gradually adding thereto the secondary zinc and iron sulphate liquor resulting from the preceding operation and thereby precipitating substantially all of the iron present in a form that can be readily settled and filtered, and removing the iron precipitate from the liquor associated therewith.

2. The improvement in the treatment of oxidic zinciferous material of relatively high iron content with sulphuric acid to produce zinc sulphate substantially free from iron, which comprises leaching the zinciferous material with relatively dilute sulphuric acid and separating the resulting primary zinc sulphate liquor from the residual material, subjecting said residual material to the action of relatively concentrated sulphuric acid until a large proportion of the zinc content thereof has been converted to secondary zinc sulphate solution, subjecting said primary zinc sulphate liquor to the oxidizing action of air in the presence of a base (such as zinc oxide) and a compound of copper while gradually adding thereto the secondary zinc sulphate liquor resulting from the preceding operation and thereby effecting a rapid oxidation of ferrous iron present and the precipitation of the resulting ferric iron in a form that can be readily settled and filtered, and removing the iron precipitate from the liquor associated therewith.

3. The improvement in the treatment of oxidic zinciferous material of relatively high iron content with sulphuric acid to produce zinc sulphate substantially free from iron, which comprises subjecting the zinciferous material to the action of relatively dilute sulphuric acid until a large proportion of the zinc content of the material has been converted to primary zinc sulphate, separating the resulting primary zinc sulphate liquor from the residual material, subjecting said residual material to the action of relatively concentrated sulphuric acid until a large proportion of the zinc content thereof has been converted to secondary zinc sulphate solution, subjecting said primary zinc sulphate liquor to the oxidizing action of air in a finely disseminating state in the presence of a base (such as zinc oxide) and a compound of copper while gradually adding thereto the product of the preceding operation containing dissolved zinc and iron sulphates and thereby effecting precipitation of substantially all of the iron present, subjecting the product of said oxidizing treatment to a classifying treatment for the removal therefrom of a substantial amount of insoluble material, thickening the slimes product of said classifying treatment to produce the contemplated zinc sulphate liquor and a thickened sludge, subjecting said thickened sludge to a filtering and washing treatment, and utilizing the wash water of said washing treatment in making up leaching liquor for treating fresh quantities of said zinciferous material and/or of said residual material.

4. The improvement in the purification of zinc sulphate solutions which comprises subjecting a zinc sulphate solution containing a relatively small amount of iron to a rapid oxidizing treatment while gradually adding thereto a zinc sulphate solution containing a relatively large amount of iron whereby substantially all of the iron is precipitated in a form which can be readily settled and filtered.

5. The improvement in the purification of zinc sulphate solutions which comprises subjecting a zinc sulphate solution containing a relatively small amount of iron to the oxidizing action of air in the presence of a base while gradually adding thereto a second zinc sulphate solution containing a relatively large amount of iron whereby substantially all of the iron is precipitated in a form which is readily settled and filtered, and removing the iron precipitate from the solution.

6. The improvement in the purification of zinc sulphate solutions which comprises adding a base such as zinc oxide to a zinc sulphate solution containing a relatively small amount of ferric iron, gradually adding thereto a zinc sulphate solution containing a relatively large amount of ferric iron whereby ferric iron is precipitated in a form which is readily settled and filtered, and removing the iron precipitate thus formed from said zinc sulphate solutions.

ARNE J. MYHREN.